Aug. 7, 1934.   H. KOCH   1,969,466
TICKET SCALE
Filed Feb. 11, 1930   4 Sheets-Sheet 1

INVENTOR
HENRY KOCH
BY
ATTORNEY

Aug. 7, 1934.                H. KOCH                 1,969,466
                           TICKET SCALE
                        Filed Feb. 11, 1930        4 Sheets-Sheet 2

INVENTOR
HENRY KOCH
BY
Maurice B Landers
ATTORNEY

Aug. 7, 1934.                    H. KOCH                    1,969,466
                              TICKET SCALE
                      Filed Feb. 11, 1930        4 Sheets-Sheet 4

INVENTOR
HENRY KOCH
BY
ATTORNEY

Patented Aug. 7, 1934

1,969,466

UNITED STATES PATENT OFFICE 1,969,466

TICKET SCALE

Henry Koch, Jamaica, N. Y., assignor to International Ticket Scale Corporation, New York, N. Y., a corporation of Delaware Application February 11, 1930, Serial No. 427,480

10 Claims. (Cl. 194—35)

The present invention has for an object to provide an improved weighing scale.

The invention has been developed in connection with the production of an improved automatic coin-controlled ticket-printing weighing scale and for convenience of description such an embodiment of the invention will be more particularly described. It will be understood, however, that the particular description is illustrative merely and is not intended as defining the limits of the invention.

The machine to be described comprises a base with a load platform on which the person to be weighed stands and a column with automatic coin-controlled weighing and ticket printing mechanism housed therein. In operation, when a person steps on the load platform, a spring weighing mechanism within the column acts to rotate a weight indicating dial having weight indicating characters which, preferably, are not visible from the exterior of the machine and power storing devices are actuated to store power for operating the ticket printing mechanism. A coin may then be deposited to release the ticket printing mechanism, whereupon a weight indicating ticket is printed and delivered.

The automatic mechanism of the scale is so constructed and arranged that the downward movement of the load platform which occurs when the platform is loaded by a person stepping thereon acts to move a power storing plunger upward to wind the machine and this movement of the plunger simultaneously feeds a ticket and applies tension to the ticket printing and cut-off mechanism. Thereafter, upon deposit of a coin the applied tension actuates the ticket printing and cut-off mechanism and then releases the plunger so that it may move downward to initial position, during which downward movement the plunger resets the ticket printing and cut-off mechanism for a successive operation.

The nature and objects of the invention will be better understood from a description of a particular embodiment for the purpose of which description reference should be had to the accompanying drawings forming a part hereof and in which—

Figure 1:
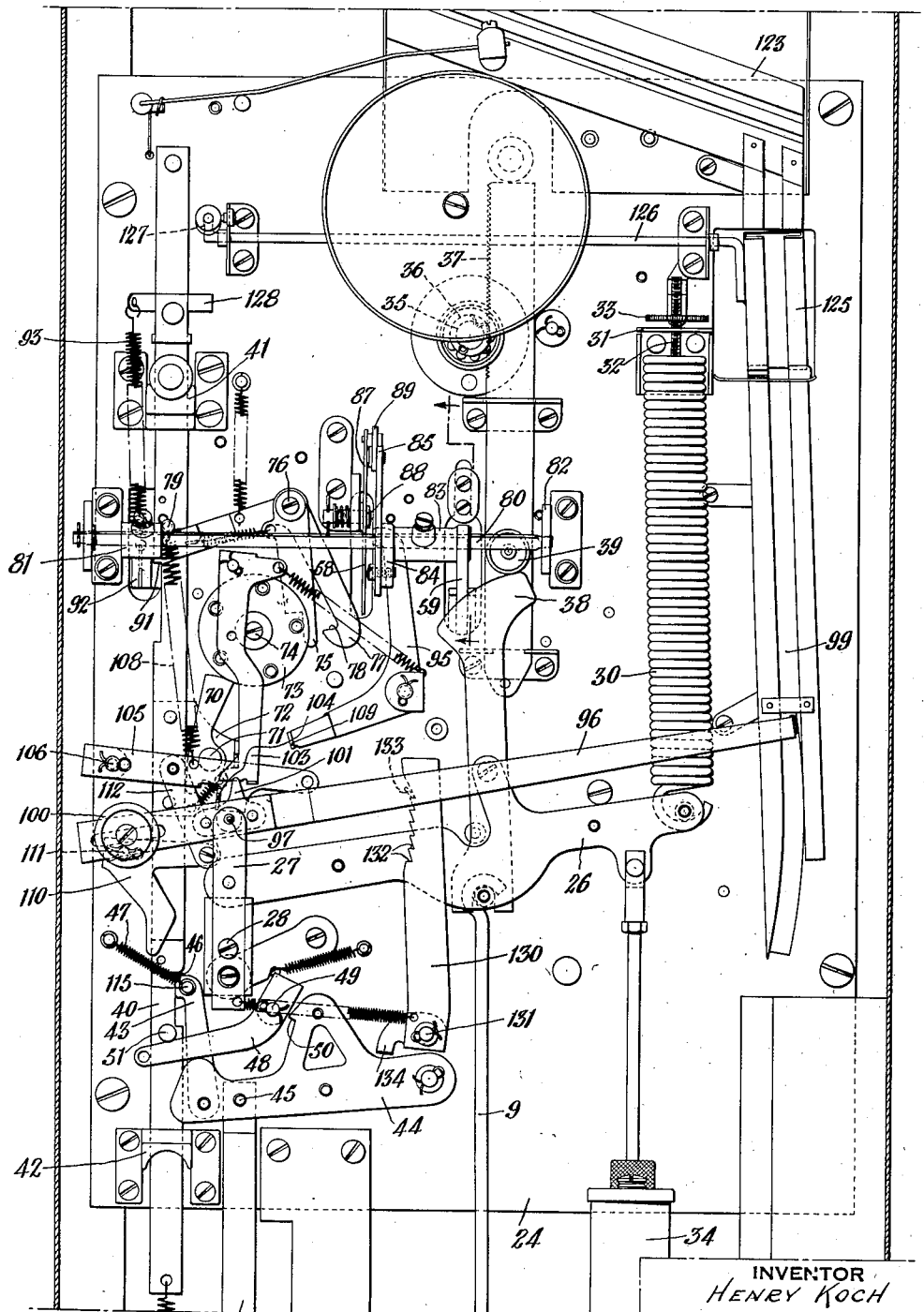

Figure 1 is a view in elevation of the principal working parts as seen from the rear of the machine, the parts being shown in normal position, that is to say, in the position assumed before the load platform is loaded, the ticket printing and cut-off mechanism being shown as cocked.

Figure 2:
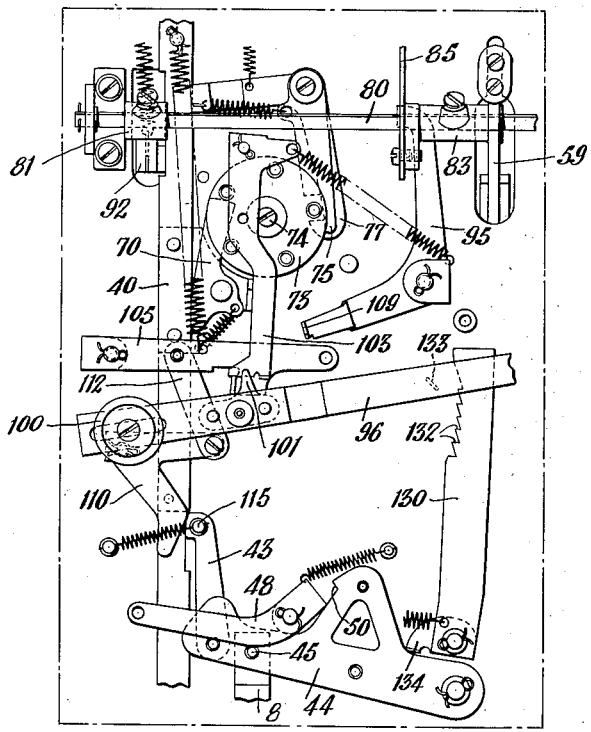
Figure 3:
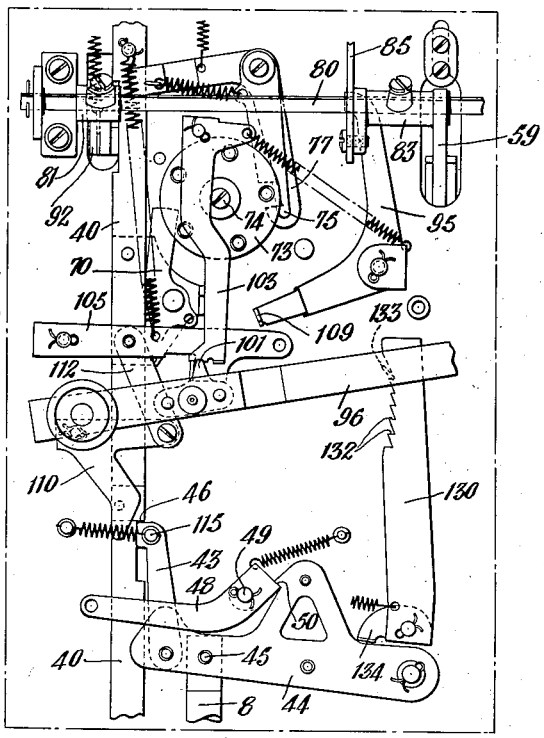
Figure 8:
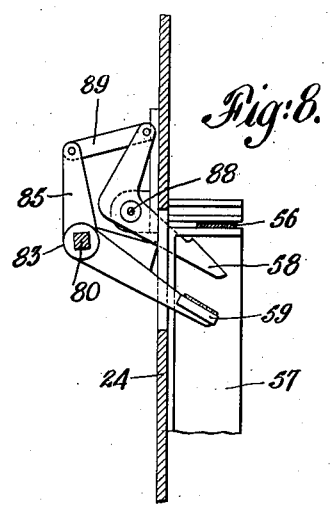
Figures 4, 5:
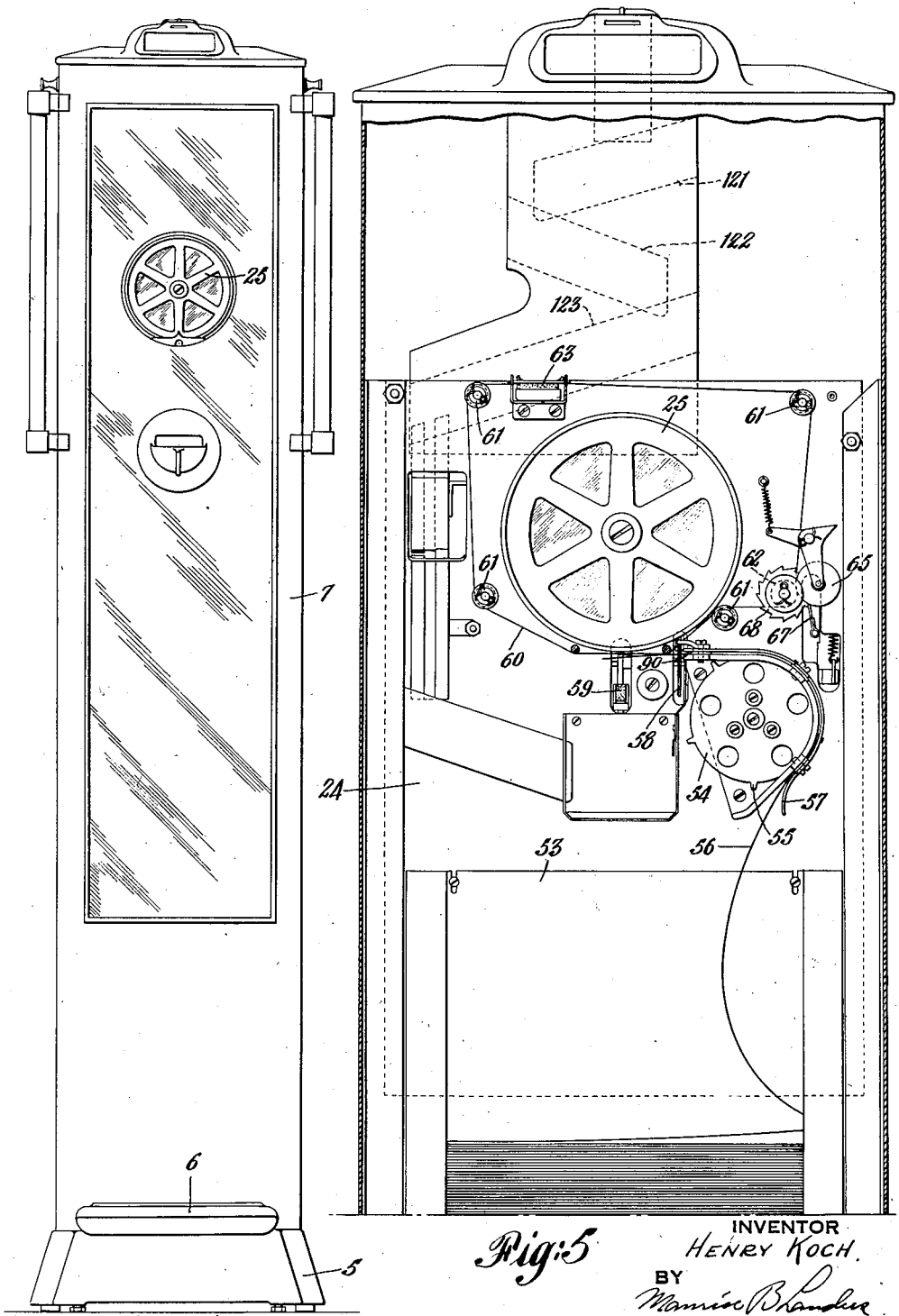
Figure 6:
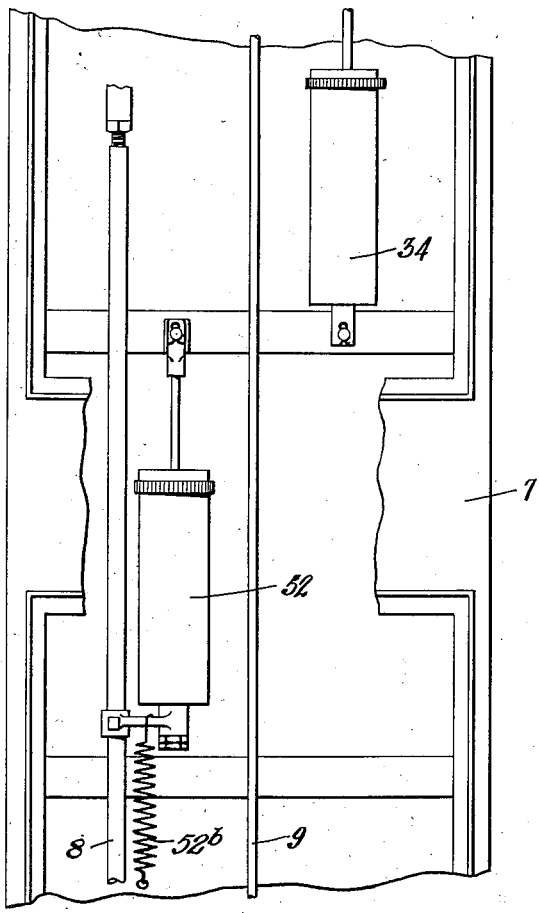
Figure 7:
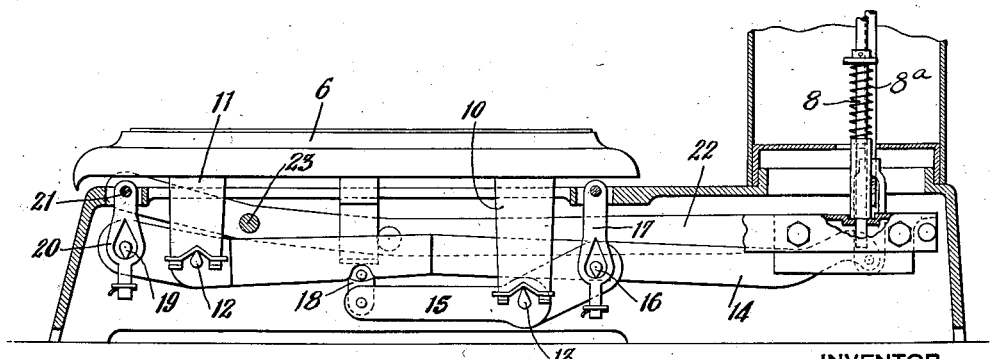

Fig. 2 is a view of certain parts of the mechanism shown in Fig. 1 but showing the parts in the position assumed when a load is placed upon the load platform but before insertion of a coin to release for operation the ticket printing and cut-off mechanism, Fig. 3 is similar to Fig. 2 but showing the parts in the position assumed when the scale is loaded but the load removed without inserting a coin to release the ticket printing and cut-off mechanism as occurs, for example, when a person steps on the load platform and steps off without inserting a coin, Fig. 4 is a front view of the exterior of the scale, Fig. 5 is a view in elevation of the weight indicating and ticket printing mechanism as seen from the front of the machine when the front panel of the casing is removed, Fig. 6 is a view showing the load platform with the weighing levers and certain actuating members connnected thereto, Fig. 7 is a vertical sectional view showing the arrangement of the weighing levers and of the power storing lever, Fig. 8 is a detail view in side elevation showing the cut-off knife and the printing hammer.

The scale shown for the purpose of illustration comprises a base 5 carrying a vertically movable load platform 6 and a vertical column 7 in which is arranged the weighing and ticket printing mechanism suitably connected to the platform to be actuated thereby. The platform may be described as having two relatively independent movements when a load is applied thereto, the one movement actuating power storing devices through the vertical winding rod 8 and requiring the application of a relatively small weight serving in effect to take up a certain loss motion and the other movement actuating the weighing mechanism through the vertical steelyard rod 9. The power storing devices supply the power necessary for actuating the ticket feeding, printing and cut-off mechanism and the weighing mechanism is arranged to operate independently to weigh the load and to position the weight indicating devices in readiness for printing of the ticket.

The method of suspension of the load platform and its connections to the operating parts is shown in Figs. 6 and 7. The platform 6 has four downwardly extending legs 10, 11 which rest on knife edges 12, 13 carried, respectively, by the main weighing lever 14 and the auxiliary weighing lever 15. The auxiliary weighing lever at its rear end has knife edges 16 carried by links 17 suspended from fixed pivots in the scale base and at its forward end is connected by a swinging link 18 to the main weighing lever at a suitably chosen point.

The main weighing lever has at its forward end knife edges 19 supported in links 20 suspended at 21 on the forward end of a power storing operating lever 22 pivoted in the base at 23 and connected at its rear end to the vertical winding rod 8 to actuate the power storing mechanism. The forward end of the power storing operating lever 22 has only a limited vertical movement and when the scale is loaded assumes its lowermost position and thereafter acts as a fixed support for the links 20. However, the arrangement of the weighing spring and associated mechanism is such as to be independent in operation of the position of the power storing lever and the links carried thereby. It will be noted that the load platform 6 operates with a slight tilting movement for the reason that the vertical movement of the rear end of the power storing lever permits a greater vertical movement of the front end of the platform than of the rear end.

In order to avoid shocks to the mechanism as the result of persons jumping on the load platform, a spring 8a is interposed in the connection between the winding rod and the power storing lever 22.

The mechanism within the column of the machine is mounted on a central supporting plate 24. Rotatably mounted in the plate is a weight indicating wheel 25 having printing type formed on its peripheral face. This printing wheel is operated from the steelyard rod 9 through a suitable weighing mechanism including a weighing spring and a sealing device which makes possible the correction for inaccuracies of the spring. As shown the weighing mechanism comprises a weighing lever 26, the fixed end of which is pivoted in a bracket 27 secured by screws 28 to the supporting plate and the floating end of which is supported by a weighing spring 30 adjustably supported in a bracket 31 by screw 32 and nut 33. The movement of the weighing lever 26 is damped by connection to a dash pot 34.

The printing wheel 25 is rigidly secured to the shaft 35 rotatable in roller bearings in the supporting plate 24 and carrying a pinion 36 which is actuated by a rack 37 movable vertically under the control of the weighing lever 26. In order that compensation may be made for inaccuracies or irregularities in the action of the weighing spring, the connections between the rack 37 and the weighing lever 26 comprise a sealing device consisting of a sealing cam 38 rigidly connected to the weighing lever 26 and a roller 39 carried by the rack and resting upon the top of the sealing cam.

To seal the scale the screw 32 is adjusted within the uper end of the spring 30 to give said spring the desired effective length and the position of the spring is adjusted by means of the nut 33. The platform is then loaded successively with different weights and the surface of the sealing cam is filed or scraped to cause the printing wheel 25 to indicate correctly each weight.

Cooperating with the weighing mechanism are mechanisms for feeding, printing, cutting off and delivering weight indicating tickets, all operated by power supplied through the vertical winding rod 8. In the arrangement shown a main power storing plunger 40 slidable vertically in upper and lower brackets 41, 42 secured to the main supporting plate 24 is moved upwardly when the load is applied to the scale by a pawl 43 carried on a lifting lever 44 connected at 45 to the winding rod 8. Engagement of the pawl 43 with a shoulder 46 on the power storing plunger 40 is assured by a spring 47. Inasmuch as the tickets are fed upon movement of the power storing plunger it is desirable to make provision whereby the plunger will not be repeatedly operated by persons stepping onto and off of the scale without depositing coins to cause printing and delivery of tickets. To this end a pawl 48 pivoted to the supporting plate at 49 is arranged to engage a shoulder 50 of the lifting lever 44 and hold it in partially operated position and therefore to retain the plunger 40 in elevated position if a person steps off of the scale without operating the scale. This pawl 48 however is arranged to be tripped upon operative downward movement of the plunger to release it from the shoulder 50 of the lifting lever 44 by engagement of a pin 51 carried by the plunger. The movement of the winding rod 8 is damped by a dash pot 52 suitably connected to the rod and to a fixed part of the scale and its return downward movement is insured by a suitable spring 52b connected to the rod and to the scale frame.

The ticket feeding mechanism is actuated by the plunger during its upward movement. The ticket printing and cut-off mechanism are actuated by springs which are tensioned during the upward movement of the plunger when the detent mechanisms thereof are released by the coin-controlled mechanisms and these mechanisms are again reset by the plunger during its downward movement. Tickets to be printed are carried on the front of the main supporting plate 24 in a suitable magazine, such as an accordion fold ticket magazine 53 as indicated in Fig. 5, from which they are drawn over a ticket feeding wheel 54 having prongs 55 arranged to engage apertures in the tickets. As shown, the ticket strip 56 passes through a guide 57 around the wheel 54 and in which guide it is pushed forward by said wheel 54 past the cut-off knife 58 and printing hammer 59 beneath the printing wheel 25. Printing is accomplished by an upward blow of the printing hammer which presses the ticket against the under side of the printing wheel, a suitable printing ribbon 60 being interposed. As shown, the ribbon passes around guide rollers 61, feed roller 62 and over an inking pad 63 and is fed by intermittent rotation of the feed roller 62, the surface of which is slightly roughened and against which the ribbon is pressed by a tension roller 65 yieldably spring pressed thereagainst.

The intermittent rotation of the feed wheel is accomplished by a pawl 67 carried by the power storing plunger 40 on a pin projecting through a slot in the main supporting plate, said pawl engaging a ratchet wheel 68 connected to the feed roller. Feeding of the ticket occurs during upward movement of the power storing plunger 40 through the action of a pawl 70 pivoted at 71 to a bracket 72 on the plunger and at its free end engaging the pins of the wheel 73 secured on the shaft 74 rotatably mounted in the main supporting plate and carrying at its opposite end the ticket feed sprocket wheel 54. Backward movement of the feed wheel is prevented by a pawl 75 pivoted at 76 and spring pressed into engagement with the wheel, and overthrow of the feeding movement is prevented by a bell crank pawl 77 also pivoted at 76, one arm of which carries a hook 78 engageable with the pins of the wheel and the other arm of which projects into position to be engaged by a pin 79 projecting from the power storing plunger and thereby held out of engagement with the pin wheel when the plunger is in its lowermost position and during the first part of its upward motion to permit rotation of the wheel by the pawl 70 for feeding the ticket.

The cut-off knife 58 and the printing hammer 59 are both operatively connected to a transverse rock shaft 80 rotatably mounted in brackets 81, 82 on the main supporting plate. The printing hammer 59 is shown as carried at the free end of an arm which for convenience of construction is formed integral with a sleeve 83, the opposite end of which sleeve is formed with a second integral arm 84 which serves as a point of connection for a bell crank lever 85 operatively connected to the ticket cut-off knife 58. The knife is shown as formed on one arm of a bell crank lever 87 pivoted at 88 and connected by a link 89 to the bell crank lever 85. This knife cooperates with a second blade 90 secured to the ticket guide thus forming shears. The relative positions of the knife and printing hammer are preferably such that the knife completes its cutting operation slightly before the printing hammer presses the ticket into contact with the printing wheel. The cutting knife and printing hammer rock shaft 80 is cocked upon downward movement of the power storing plunger by engagement of a shoulder 91 of the plunger with an arm 92 secured to the rock shaft. This arm also serves as a point of attachment for a tension spring 93 which when the plunger is in uppermost power storing position is under sufficient tension to supply the necessary force for operating the cut-off knife and printing hammer. The rock shaft 80 is held in cocked position by a latch 95 which conveniently may engage the horizontal arm of the bell crank lever 85 which pawl is arranged to be tripped by the coin release mechanism upon insertion of a coin. As shown, a coin release lever 96 is pivoted between the bracket 27 and the main plate at 97, its free end projecting into position to be engaged and operated by a coin falling in the coin slot 99 and its rear end carrying a counter-weight 100 tending normally to return the lever to initial position after operation by a coin. An upstanding arm 101 of the coin lever is arranged to engage a latch 103 which when the mechanism is cocked retentively engages a projection 104 of a trip lever 105 pivoted at 106 to the main supporting plate. The latch 95 and latch 103 are both urged to latching position by a single tension spring. When the latch 103 is moved to the right by the arm 101 upon insertion of a coin, the trip lever 105 is actuated by a tension spring 108, the upper end of which is secured to the pin 79 on the power storing plunger, the spring therefore being placed under tension when the plunger is in its uppermost position. The free end of the tripping lever is engageable with the outwardly bent end 109 of the rock shaft holding latch 95 and when actuated upwardly by the spring 108 upon release by the latch 103 will free the knife and hammer rock shaft to cut off and print the ticket. When the parts are set, there is a free space between the tripping lever 105 and the end of the arm engaged thereby in order that its action may be somewhat in the manner of a blow the better to insure release of the latch.

In the machine shown it is desirable to release the power storing plunger and the winding rod to permit downward movement thereof immediately after printing of the ticket. To this end a releasing lever 110 is pivoted at 111 on the main supporting plate and is operatively connected by a link 112 to the tripping lever 105. The lower end of this lever has a cam surface which engages a stud 115 on the lifting latch 43 to release it from the shoulder 46 of the power storing rod. Springs 93 and 108 pull downwardly on the plunger but an additional spring 116 is preferably arranged at the lower end of the plunger to insure its downward movement. As the plunger moves downwardly under the action of the several springs, a pin 51 projecting from the plunger engages and releases the latch 48 to permit the winding rod 8 to move down when the load platform is released from its load. During this downward movement of the power storing plunger the knife and hammer rock shaft is reset by engagement of the shoulder 91 with the arm 92 and the releasing lever 110 is reset by engagement of a shoulder 120 on the bracket 72 carried by the plunger. The releasing lever is moved downwardly in this action until the projection 104 is below the point of engagement with the latch 103. When a load is again applied to the load platform the winding rod 8 acts to lift the power storing plunger to wind the machine and place the spring 93, the spring 108 and the spring 116 under tension ready for another weighing operation.

It is desirable to provide for a delay between the moment of inserting the coin and the moment of operation. To this end coin guides 121, 122, 123 are arranged in inclined relation along which a coin may roll to the coin guide which carries the coin to the point of engagement with the coin release lever 96. It is desirable to make provision for return of the coin in the event the coin is deposited when the machine is not wound up for operation. To this end a section 125 of the coin guide is carried on a rock shaft 126 an arm 127 of which is engaged by an arm 128 projecting from the plunger to hold the coin guide section in alined position when the plunger is in wound position. At other times this section alines with a return guide to return the coin. In the particular machine shown means is provided for holding the coin release lever against operation by a coin, if at the time when the coin reaches the lever the load platform is not loaded. This condition could occur, even in a machine having the coin diverting movable guide section 125, as the result of a person stepping off of the scale after depositing a coin and just before the coin reached the coin release lever. The means shown consists of a latch 130 pivoted to the supporting plate at 131 and having teeth 132 engageable with a pin 133 on the coin release lever. Movement of the latch to lever releasing position is caused when the platform is loaded by engagement of a foot piece 134 with the upper side of the lever 44. If the lever is in its lowermost position or is locked in its partially raised position, the latch will engage the coin release lever but, if the lever is raised to its uppermost position by a load on the platform, the coin release lever will be free to operate.

I claim:—

1. In a ticket printing weighing scale, the combination of a load platform, ticket printing mechanism comprising an actuating spring, a power storing plunger arranged to cock the printing mechanism by one movement and to tension the actuating spring by another movement and means for tripping the ticket printing mechanism.

2. In a coin controlled weighing machine, in combination, a load platform, a power storing plunger, ticket printing mechanism, a coin release lever controlling the printing mechanism, operative connections between said load platform and said power storing plunger comprising a winding rod and a lever connected thereto and operatively connected to the power storing plunger, a detent member arranged to retain said operative connections in an intermediate position, a latch operated by said lever and engageable with the coin release lever to prevent operation thereof when the winding rod is in an intermediate position but permitting operation when the winding rod is fully actuated.

3. In a coin controlled weighing machine, in combination, a load platform, ticket printing mechanism, a power storing plunger arranged to supply power for operating said ticket printing mechanism, a coin release lever arranged to initiate the operation of said ticket printing mechanism, operative connections between said load platform and power storing plunger to operate the latter when the platform is loaded, a detent arranged to hold said operative connections in intermediate position when the load is removed from the platform without operation of the ticket printing mechanism, a latch engageable with said coin release lever to prevent operation thereof when said connections are in intermediate position but arranged to be moved to release said lever when the platform is fully loaded.

4. In a coin controlled weighing machine, in combination, a load platform, a power operated ticket printing mechanism, a power storing plunger having means to set said ticket printing mechanism, connections between the load platform and the power storing plunger, a coin release lever arranged to initiate the operation of said ticket printing mechanism and means for preventing operation of said coin release lever by a coin when the platform is not loaded comprising a latch engaging said coin release lever but movable into disengaging position upon loading of the platform.

5. In a coin controlled weighing machine, in combination, a load platform, a power operated ticket printing mechanism a power storing plunger having means to set said ticket printing mechanism, connections between the load platform and the power storing plunger, a coin release lever arranged to initiate the operation of said ticket printing mechanism and means for preventing operation of said coin release lever by a coin when the platform is not loaded comprising a latch engageable with said coin release lever to prevent operation thereof when the load platform is not loaded and means actuated by the connections between the load platform and the power storing plunger for releasing said detent when the platform is loaded.

6. In a ticket printing weighing scale having ticket feeding, printing and cut-off mechanism, a ticket feeding sprocket wheel and means for actuating said sprocket wheel comprising a driving wheel operatively connected to said sprocket wheel, a power storing plunger, a feeding pawl carried thereby and engageable with said driving wheel and a pawl cooperating with said driving wheel to limit rotation thereof when actuated by said feeding pawl and means whereby said pawl is held in retracted position during the first part of the feeding motion of the power storing plunger.

7. In a ticket printing weighing scale having ticket feeding, printing and cut-off mechanism, a ticket feeding sprocket wheel and means for actuating said sprocket wheel comprising a driving wheel operatively connected to said sprocket wheel, a power storing plunger, a feeding pawl carried thereby and engageable with said driving wheel and a pawl cooperating with said driving wheel to limit rotation thereof when actuated by said feeding pawl and means whereby said pawl is held in retracted position during the first part of the feeding motion of the power storing plunger together with a pawl engaging said sprocket wheel to prevent reverse rotation.

8. In a ticket printing weighing scale the combination with a ticket feeding sprocket wheel of actuating mechanism therefor comprising a driving wheel operatively connected to said sprocket wheel a power storing plunger, a feeding pawl carried thereby and engageable with said driving wheel and a second pawl engageable with said driving wheel to limit the rotation thereof, together with means for holding said secondary pawl in retracted position during the first part of the reciprocating movement of said power storing plunger.

9. In a coin controlled weighing machine, the combination with a load platform of ticket printing and delivering mechanism actuated by movement of the platform, a coin controlled tripping lever arranged to trip said ticket printing and delivering mechanism to produce actuation thereof, a toothed sector engageable with said tripping lever to prevent actuation thereof by a coin and means actuated by the load platform to move said toothed sector out of engagement with the tripping lever.

10. In a ticket printing weighing scale, the combination of a load platform, ticket printing mechanism comprising an actuating spring, a power storing plunger arranged to cock the printing mechanism by one movement and to tension the actuating spring by another movement and coin controlled means for tripping the ticket printing mechanism.

HENRY KOCH.